(12) United States Patent
Leu et al.

(10) Patent No.: US 8,117,447 B2
(45) Date of Patent: Feb. 14, 2012

(54) AUTHENTICATION METHOD EMPLOYING ELLIPTIC CURVE CRYPTOGRAPHY

(75) Inventors: Muh-Chyi Leu, Hsinchu (TW); Hung-Min Sun, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 838 days.

(21) Appl. No.: 12/173,024

(22) Filed: Jul. 15, 2008

(65) Prior Publication Data
US 2009/0180612 A1    Jul. 16, 2009

(30) Foreign Application Priority Data
Feb. 15, 2008 (TW) ............................. 97105431 A

(51) Int. Cl.
*G06F 15/16* (2006.01)
(52) U.S. Cl. ............ 713/168; 713/169; 713/170; 726/4; 726/17; 709/203; 709/206
(58) Field of Classification Search .................. 713/168, 713/169, 170; 455/411; 709/203, 206; 726/4, 726/17
See application file for complete search history.

(56) References Cited

U.S. PATENT DOCUMENTS

| | | | |
|---|---|---|---|
| 5,406,628 A * | 4/1995 | Beller et al. .................... 380/30 |
| 6,356,937 B1 * | 3/2002 | Montville et al. ............. 709/206 |
| 6,618,483 B1 * | 9/2003 | Vanstone et al. ................ 380/30 |
| 6,876,747 B1 * | 4/2005 | Faccin et al. .................. 380/247 |
| 7,072,865 B2 | 7/2006 | Akiyama | |
| 7,123,721 B2 * | 10/2006 | Panjwani et al. ............. 380/270 |
| 7,167,860 B1 * | 1/2007 | Black et al. ...................... 705/35 |
| 7,921,292 B1 * | 4/2011 | Pauker et al. .................. 713/171 |
| 7,929,688 B2 * | 4/2011 | Yamamichi et al. .............. 380/1 |
| 2002/0026581 A1 * | 2/2002 | Matsuyama et al. ........... 713/168 |
| 2002/0146125 A1 * | 10/2002 | Eskicioglu et al. ........... 380/255 |
| 2003/0031322 A1 * | 2/2003 | Beckmann et al. ........... 380/278 |
| 2003/0051251 A1 * | 3/2003 | Sugimoto et al. ................ 725/95 |
| 2003/0087629 A1 * | 5/2003 | Juitt et al. ....................... 455/411 |
| 2004/0006697 A1 * | 1/2004 | Noyama et al. ................ 713/182 |
| 2005/0050333 A1 * | 3/2005 | Yeap et al. ..................... 713/182 |
| 2005/0113068 A1 * | 5/2005 | Hoffmann ...................... 455/411 |
| 2005/0144634 A1 | 6/2005 | Koo et al. | |
| 2005/0177741 A1 * | 8/2005 | Chen et al. .................... 713/189 |
| 2006/0123238 A1 * | 6/2006 | Kacker et al. ................. 713/185 |
| 2006/0205388 A1 * | 9/2006 | Semple et al. ................ 455/411 |
| 2006/0218400 A1 * | 9/2006 | Kimmel et al. ............... 713/168 |
| 2007/0104097 A1 * | 5/2007 | Rassool et al. ................ 370/229 |

(Continued)

OTHER PUBLICATIONS

Seroussi, "Elliptic curve cryptography", 1999.*

(Continued)

*Primary Examiner* — Krista Zele
*Assistant Examiner* — Ondrej Vostal

(57) ABSTRACT

Disclosed is an authentication method employing elliptic curve cryptography (ECC), applicable to a mobile broadcast TV system having one or more head end systems, at least a transmitter, and at least a mobile set. The authentication method comprises at least one request message from mobile sets simultaneously or in a short period of time arriving at a head end system for authentication; manipulating each broadcast authentication message by ECC; manipulating each service request message by ECC and pairing operation; performing a mutual authentication between the head end system and mobile sets by ECC and pairing operation; and broadcasting one group of authentication messages to all the mobile sets of many requests arrived at the head end system simultaneously or in a short period of time for the same service.

18 Claims, 8 Drawing Sheets

U.S. PATENT DOCUMENTS

| | | | |
|---|---|---|---|
| 2007/0165843 A1* | 7/2007 | Lauter et al. | 380/30 |
| 2007/0248224 A1* | 10/2007 | Buskey et al. | 380/30 |
| 2008/0130895 A1* | 6/2008 | Jueneman et al. | 380/277 |
| 2008/0148047 A1* | 6/2008 | Appenzeller et al. | 713/162 |
| 2009/0063851 A1* | 3/2009 | Nijdam | 713/155 |

OTHER PUBLICATIONS

Lauter, "The Advantages of Elliptic Curve Cryptography for Wireless Security", 2004.*
Cilardo et al., "Elliptic Curve Cryptography Engineering", 2004.*
Molavi et al., "A Security Study of Digital TV Distribution Systems", 2005.*
Vijayalakshmi et al., Secure Antnet Routing Algorithm for Scalable Adhoc Networks Using Elliptic Curve Cryptography, 2007.*
Jansen, "Samenvattingen Afstudeerverslagen", 2002.*
Dimoulakis et al., "Elliptic Curve Cryptography", 2000.*
Keromytis, "Cryptography As An Operating System Service: A Case Study", 2006.*
Huang et al., "Fast Authenticated Key Establishment Protocols for Self-Organizing Sensor Networks", 2003.*
Bresson et al., "Provably Authenticated Group Diffie-Hellman Key Exchange", 2001.*
Strangio, "Efficient Diffie-Hellman Two-Party Key Agreement Protocols based on Elliptic Curves", 2005.*
Weimershirch et al., "Identity Certified Authentication for Ad-hoc Networks", 2003.*
Diament et al., "The Dual Receiver Cryptosystem and its Applications", 2004.*
Li et al., "An Efficient Group Key Establishment in Location-aided Mobile Ad hoc Networks", 2005.*
Ng et al., Designated Group Credentials, 2006.*
Watro et al., "TinyPK: Securing Sensor Networks with Public Key Technology", 2004.*
Lee et al., "Secure Key Issuing in ID-based Cryptography", 2004.*
Gupta et al., "Performance Analysis of Elliptic Curve Cryptography for SSL", 2002.*
Narn-Yih Lee, Chi-Chao Chang, Chun-Li Lin and Tzonelih Hwang, "Privacy and Non-Repudiation on Pay-TV Systems," IEEE Transactions on Consumer Electronics, vol. 46, pp. 20-27, Feb. 2000.
Ronggong Song, Korba, L., "Pay-TV system with strong privacy and non-repudiation protection," IEEE Transactions on Consumer Electronics, vol. 49, pp. 408-413, May 2003.
Eurocrypt, A Successful Conditional Access System, Vincent Lenoir, CCETT, Cesson-Sevigne (France), IEEE Transactions on Consumer Electronics, vol. 37, No. 3, Aug. 1991, P432-P436.
Reducing Elliptic Curve Logarithms to Logarithms in a Finite Field, Alfred J. Menezes, Tatsuaki Okamoto, and Scott A. Vanstone, IEEE Transactions on Information Theory, vol. 39, No. 5, Sep. 1993, p. 1639-p. 1646.
Security for Information Data Broadcasting System with Conditional-Access Control, Hideki Tsubakiyama, Keiichiro Koga, 1993 IEEE, p. 164-p. 170.
An Alternative Paradigm for Scalable On-Demand Applications: Evaluating and Deploying the Interactive Multimedia Jukebox, Kevin C. Almeroth, Member, IEEE, and Mostafa H. Ammar, Senior Member, IEEE, IEEE Transactions on Knowledge and Data Engineering, vol. 11, No. 4, Jul./Aug. 1999, p. 658-p. 672.
The Advantages of Elliptic Curve Cryptography for Wireless Security, Kristin Lauter, Microsoft Corporation, IEEE Wireless Communications• Feb. 2004, p. 62-p. 67.
Conditional Access in Mobile Systems: Securing the Application, Eimear Gallery and Allan Tomlinson Mobile VCE Research Group, Information Security Group, Proceedings of the First International Conference on Distributed Frameworks for Multimedia Applications (DFMA'05) 0-7695-2273-4/05 $ 20.00 IEEE, Feb. 2005, p. 190-p. 197.
DVB-H: Digital Broadcast Services to Handheld Devices, Gerard Faria, Jukka A. Henriksson, Senior Member, IEEE, Erik Stare, and Pekka Talmola, Proceedings of the IEEE, vol. 94, No. 1, Jan. 2006, p. 194-p. 209.
A Handover Approach to DVB-H Services, Ville Ollikainen and Chengyuan Peng, 1-4244-0367-7/06/$20.00 © 2006 IEEE, ICME 2006, p. 629-p. 632.
Service Platform for Converged Interactive Broadband Broadcast and Cellular WirelessFabio Allamandri, Sebastien Campion, Angelo Centonza, Alex Chemilov, John P. Cosmas, Member, IEEE, Annette Duffy, David Garrec, Michel Guiraudou, Kannan Krishnapillai, Thierry Levesque, Bertrand Mazieres, Ronald Mies, Thomas Owens, Michele Re, Emmanuel Tsekleves, and Lizhi Zheng, IEEE Transactions on Broadcasting, vol. 53, No. 1, Mar. 2007, p. 200-p. 211.
DVB-H and IP Datacast—Broadcast to Handheld Devices, Michael Komfeld and Gunther May, IEEE Transactions on Broadcasting, vol. 53, No. 1, Mar. 2007, p. 161-p. 170.
Implementing Cryptographic Pairings on Smartcards, Michael Scott, Neil Costigan, and Wesam Abdulwahab, research supported by Enterprise Ireland grant IF/2005/053.
IP Datacast over DVB-H: Service Purchase and Protection (SPP), DVB Document A100 Dec. 2005.

\* cited by examiner

|  | | Song's Method Communication Cost (Bits) | Present Invention Communication Cost (Bits) |
|---|---|---|---|
| Issue Phase | Mobile Set ($i$-$th$) => Head End System | 3.8K | 1.92K |
| | Head End System =>Mobile Set($s$-$th$) | $m * 2.78$K | 0.96K |
| Subscription Phase | Mobile Set $i$ =>Head End System | 4.82K | 1.28K |
| | Head End System =>Mobile Set ($s$-$th$) | $m*3.77$K | 0.96K |

FIG. 6A

| | | Song's Method Computation Cost (Bits) | Present Invention Computation Cost (Bits) |
|---|---|---|---|
| Issue Phase | Mobile Set | $6E_\% + 3M_\%$ | $3\hat{e} + 8M_{G1} + 2M_{G2} + 3A_{G1}$ |
| | Head End System | $5mE_\%$ | $(3\hat{e} + 3M_{G1} + M_{G2} + 3A_{G1})m + \hat{e} + M_{G1}$ |
| Subscription Phase | Mobile Set | $4E_\% + 2M_\%$ | $3\hat{e} + 6M_{G1} + M_{G2} + 2A_{G1}$ |
| | Head End System | $5mE_\%$ | $(4\hat{e} + 2M_{G1} + M_{G2} + 3A_{G1})m + \hat{e}$ |

FIG. 6B

AUTHENTICATION METHOD EMPLOYING ELLIPTIC CURVE CRYPTOGRAPHY

FIELD OF THE INVENTION

The present invention generally relates to an authentication method employing Elliptic Curve Cryptography (ECC), applicable to mobile broadcast TV systems, mobile pay-TV systems or mobile pay-per-view systems.

BACKGROUND OF THE INVENTION

Mobile broadcast TV has been developed actively in the recent years, and so as the related technologies. With the gradual integration of heterogeneous networks, the convergence service becomes a very important trend. Mobile broadcast TV service is an important service era of the convergence service. In the convergence service, pay service plays an important role of the mobile broadcast TV service.

Digital Video Broadcast (DVB) consortium has been actively promoting mobile broadcast service in the recent years. Mobile TV on broadcasting network is an important approach for mobile services. In DVB, the standard of mobile broadcast TV is defined in DVB-H. At present, mobile broadcast TV has several campuses under active development, which include DVB-H, MediaFLO, ISDB-T, T-DMB.

Mobile broadcast TV is a development which may provide a convergence service of broadcast and telecommunication services. To provide mobile service, DVB-H defines additional features in physical layer from existing terrestrial DVB-T, where one of the features is to process handoff/handover issue. In addition, DVB-H also applies Internet Protocol (IP) to provide multimedia service.

In the terrestrial TV, an illegal TV station may easily use the same frequency to forge an illegal TV station which causes legal TV a grave operation loss. An attacker may also easily and cheaply use the same frequency to forge an illegal TV station or transmitter attacking a legal TV station. Also, without proper and secure authentication mechanism, an impersonation subscriber may steal a service. These security problems also exist in the pay service for mobile broadcast TV. Therefore, a mutual authentication mechanism for pay service of mobile broadcast TV becomes an important mechanism.

Anonymity is an important privacy issue in protecting user information and identification to prevent abuse by unauthorized users. With the actively development of broadcast TV and the convergence of heterogeneous networks, diverse services such as pay-TV, Impulse Pay-Per-View (IPPV), VOD, multimedia services, on-line game, may be provided to the subscribers. The anonymous authentication of mobile broadcast TV also becomes an important security issue. Anonymous identity-based cryptography has been widely applied to network and communication systems.

Authentication is a security mechanism used to identify the subscribers and the legal users. The early pay TV uses a conditional access system (CAS) to operate the service access management through subscriber authentication. In a pay TV system, CAS manages a large amount of authorized subscribers. The CAS employs the entitlement message to manage the authorized subscribers and services. The CAS handle the security of the entitlement and authentication by the entitlement message allocated to subscribers. The entitlement message carries access parameters with authentication information in order to manage the service access.

Because the bandwidth of broadcast is very precious, the efficient utilization of bandwidth to achieve the broadcast efficiency in pay-TV or near-VOD is an important job. In general, the following scenarios may occur in pay-TV. A plurality of users request the same service and the same service arrives at the head end system of CAS in a short period of time or simultaneously. In order to achieve the broadcast efficiency, the service scheduling and program scheduling are necessary and important tasks. Also, efficient use of bandwidth is also important in the service or program scheduling. To achieve efficient handling, the CAS needs to schedule the entitlement messages for the arriving requests.

The early CAS uses a public key cryptosystem or symmetric key cryptosystem to manage the service security. The CAS using the public key cryptosystem uses digital signatures to authenticate the subscribers. The CAS using the symmetric key cryptosystem, such as DES or AES, uses shared secret keys to authenticate the subscribers, but fails to reach the non-repudiation protection. However, in the situation of multiple service operations, the symmetric key technique may suffer insecure risk and fail to reach the non-repudiation protection.

For example, Song et. al. disclosed an E-ticket scheme for pay-TV systems. The E-ticket scheme may achieve the privacy and non-repudiation protection for pay-TV systems. The scheme is based on RSA public key cryptography, and employs an encrypted authentication message with digital signature to execute mutual authentication. This scheme also supports anonymity. Lee et. al. also disclosed related schemes. These techniques all use one-to-one authentication message delivery without proposing an effective measure for the scenario when a plurality of users requesting the same service which arrives at the CAS head end system simultaneously or in a short period of time.

In recent years, the elliptic curve cryptography (ECC) becomes more efficient in same security level, or called key length, than the integer factoring scheme. The pairing technology applied to elliptic curve research has also been disclosed, such as Weil Pairing, Tate Pairing, and so on. These pairing technologies may be applied to encryption, digital signature and authenticated key agreement, and so on. For example, the bilinear pairing technology is applied to the supersingular elliptic curve, bilinear Diffe-Hellman problem, and discrete logarithm problem.

The following describes the technical terminologies and definitions used in ECC. Mathematically, ECC is defined on the finite algebraic structure. To simplify the description, the elliptic curve in the following description is defined on the finite algebraic structure $F_p$, where characteristic $p>3$. Elliptic curve E defined on $F_p$ may be simplified as the following form: E: $y^2=x^3+ax+b$, where $a \cdot b \in F_p(p>3)$, and $4a^3+27b^2 \neq 0$. The points on elliptic curve E form a group and the group includes a point at infinity, depicted as O. According to the group definition, any point P of elliptic curve E must satisfy $P+(-P)=O$. The elliptic curve group is an additive group.

Assume that line l passes two different points P and Q of elliptic curve E. Line l and elliptic curve E intersects at a third point $-R$, and $P+Q=R$. If line l is tangent to elliptic curve E, $P+P=2P$. Generally, point multiplication is defined as $Q=kP$, where k is an integer. A famous problem, called elliptic curve discrete logarithm problem (ECDLP), is that it is difficult to find an integer k so that $Q=kP$ for a given point Q on elliptic curve E. Many security technologies based on ECC are proposed according to ECDLP. The bilinear pairing technique is a nice scheme to realize the identity-based cryptography. The bilinear pairing technology is a mapping to map a subgroup of points on an elliptic curve to subgroup of elements in a finite field.

SUMMARY OF THE INVENTION

The disclosed exemplary embodiments according to the present invention may provide an authentication method based on elliptic curve cryptography (ECC), applicable to a mobile broadcast TV systems, mobile pay-TV systems or mobile pay-per-view systems. The mobile broadcast TV system at least includes one or more head end systems, at least a transmitter, and at least a mobile set.

In an exemplary embodiment, the disclosed is directed to an authentication method based on ECC. The authentication method comprises: one or more request messages from mobile sets simultaneously or in a short period of time arriving at a head end system for authentication; computing each broadcast authentication message by ECC; computing each service request message by ECC and pairing operation; constructing a mutual authentication between the head end system and mobile sets by ECC and pairing operation; and broadcasting one group of authentication messages to all the mobile sets of many requests arriving at the head end system simultaneously or in a short period of time for the same service.

The above disclosed exemplary embodiments employ the point addition of ECC and bilinear pairing to the authentication parameters so as to achieve the one-to-many authentication message broadcast.

The foregoing and other features, aspects and advantages of the present invention will become better understood from a careful reading of a detailed description provided herein below with appropriate reference to the accompanying drawings.

BRIEF DESCRIPTION OF THE DRAWINGS

FIG. 6A shows an exemplary comparison and analysis of the present invention and a conventional method in terms of communication cost.

FIG. 6B shows an exemplary comparison and analysis of the present invention and a conventional method in terms of computational cost.

DETAILED DESCRIPTION OF THE EXEMPLARY EMBODIMENTS

The disclosed embodiments of the present invention provide a one-to-many authentication message broadcast, and take into account the that scenario that a plurality of users' requests arrive at the head end system simultaneously or in a short period of time for the same service. The subscribers to the pay service of mobile broadcast TV may anonymously authenticate whether the head end system is genuine.

The present invention employs ECC and pairing operation to realize the mobile broadcast TV authentication, and the authentication has the efficient broadcast effect. Through ECC and pairing operations, the efficient broadcast of authentication messages may also be obtained. Besides, through the use of pairing operation and ECC, the attacks from man-in-the-middle or forgeries may also be resisted.

The following describes the technical terminologies, definitions and features of the bilinear pairing operation related to the present invention. Let elliptic curve E be defined over the finite algebraic structure $F_p$, there exists an isomorphism between a set of certain points on E to a subgroup on $F_p$. Assume that #E is the number of points in E over $F_p$. Let n be a prime number such the n|#E, and n and the characteristic p of $F_p$ are mutually prime. E has points of order n; i.e., the point P∈E satisfying the equation nP=O, P≠O. Point P is called the generator of the subgroup of E over $F_p$, and P has an order of n.

Let $G_1$ be a cyclic additive group with a generator P and an order of prime number q, and $G_2$ be a multiplicative group with an order of q. Assume that the discrete logarithm problem in both $G_1$ and $G_2$ is hard to solve. Typically, $G_1$ is a subgroup of a point set on E and $G_2$ is a subgroup of $F_p$. Let ê be a bilinear mapping, i.e., ê: $G_1 \times G_1 \rightarrow G_2$, satisfying and the following three conditions:

(1) Bilinearity: $ê(P_1+P_2, Q)=ê(P_1, Q) ê(P_2, Q)$, $ê(P, Q_1+Q_2)=ê(P, Q_1) ê(P, Q_1)$, and $ê(aP, bQ)=ê(P, Q)^{ab}$, for all Q, P, $P_1, P_2, Q_1, Q_2 \in G_1$ and a, $b \in Z_q^*$; where $Z_q^*$ is a mathematical symbol for integer finite field;

(2) Non-degeneracy: there exists P∈$G_1$, such that $ê(P, P) \neq 1$; and (3) Computability: there exists an efficient algorithm to compute ê(P, Q) in polynomial time.

Figure 1A:
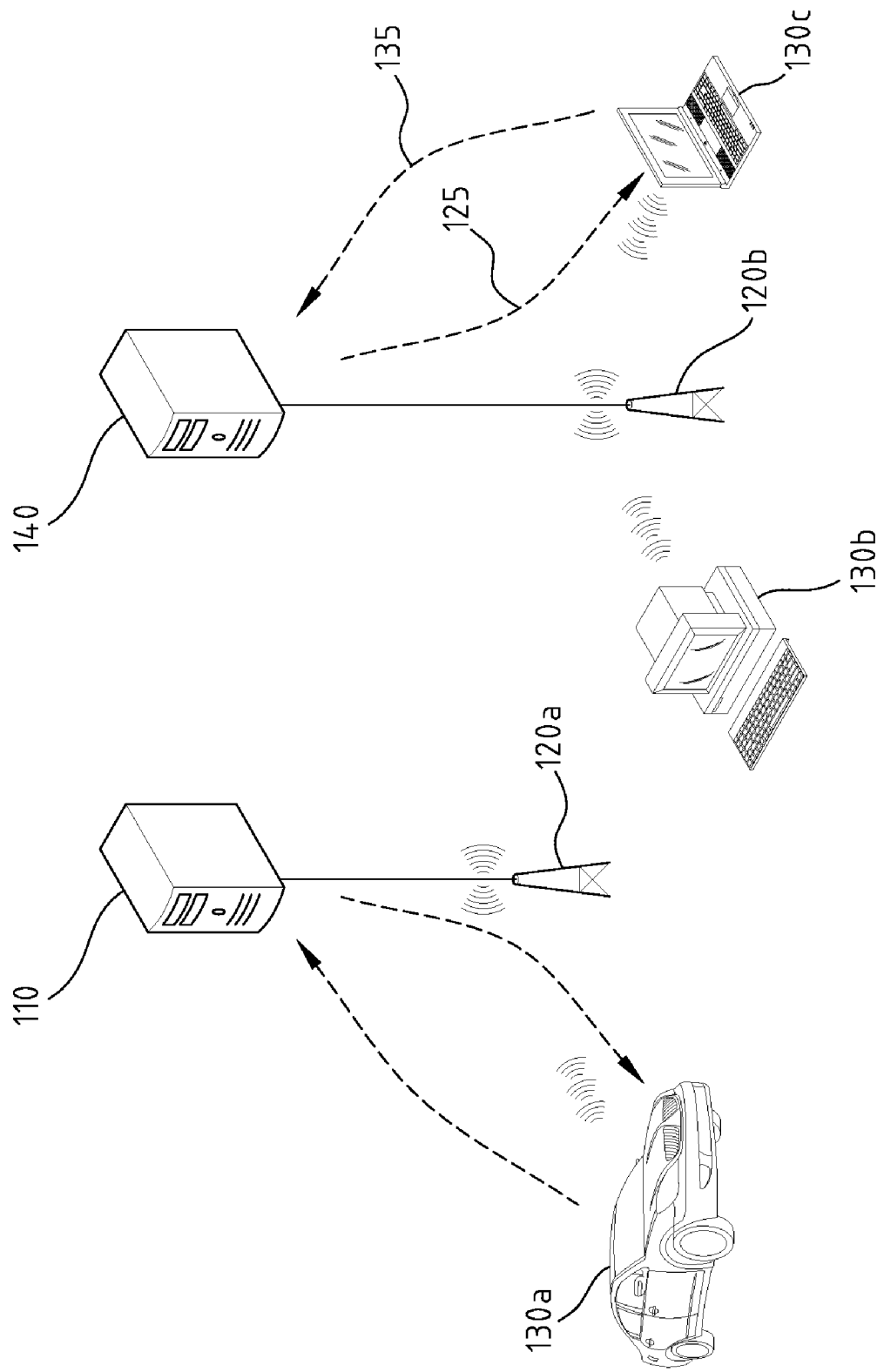
FIG. 1A shows an exemplary schematic view of the application of an authentication method based on ECC to a mobile broadcast TV system, consistent with certain disclosed embodiments of the present invention.

The following describes how the present invention employs ECC and pairing operation, and is applicable to the mobile broadcast TV systems, mobile pay-TV systems or mobile pay-per-view systems. FIG. 1A shows an exemplary schematic view of the application of an authentication method based on ECC to a mobile broadcast TV system, consistent with certain disclosed embodiments of the present invention. Referring to FIG. 1A, a mobile broadcast TV system includes a head end system 110, one or more transmitters and one or more mobile sets, such as transmitters 120a, 120b and mobile sets 130a, 130b, 130c.

Head end system 110, such as a system for handling audio/video or multimedia service, has a power processor. A transmitter may be a base station carrying and transmitting wireless signals to mobile sets. A mobile set is a user device requesting services. The mobile broadcast TV system uses 3G/Universal Mobile Telecommunications System (UMTS) or Global System for Mobile Communication (GSM) as a return channel. The return channel is connected to the head end system for providing interactive service.

Whenever a user requests a service, the corresponding mobile set must transmit messages to head end system 110. The message consists of authentication and the service request for user authentication. When head end system 110 authenticates that the mobile set is legal, the head end system will broadcast the authentication information to each mobile set. After the mobile set confirms that the head end system is genuine, the mobile set may obtain the service.

Figure 1B:
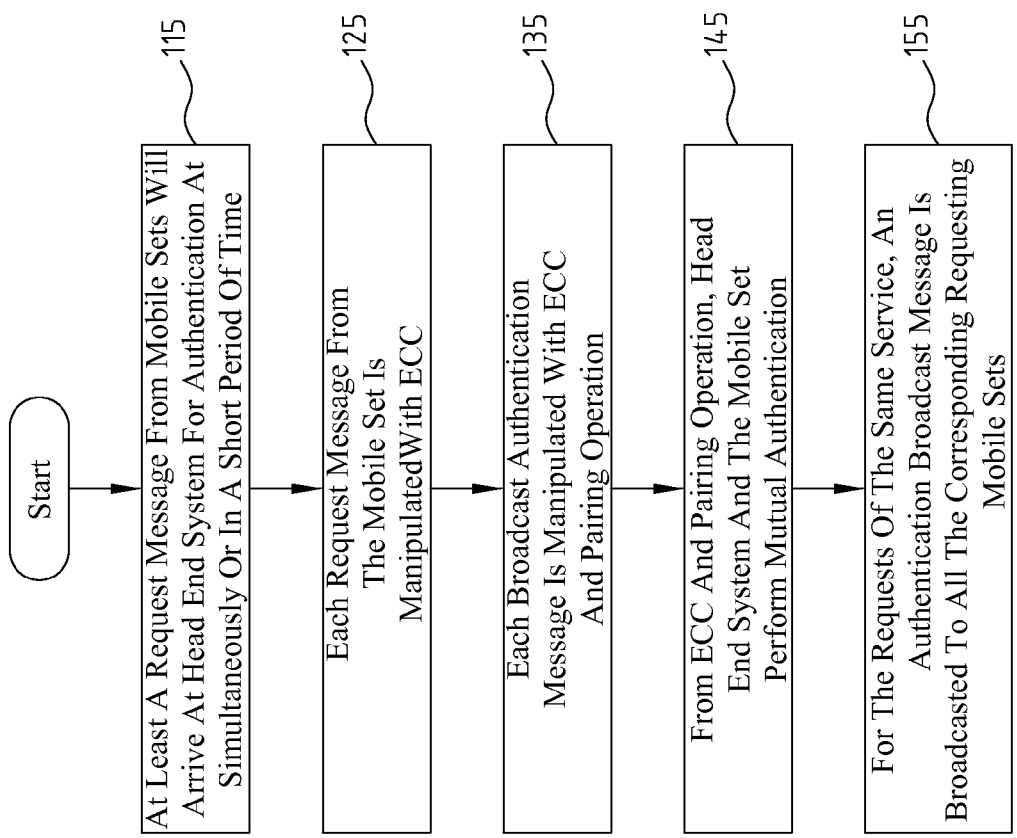
FIG. 1B shows an exemplary operation of an authentication method based on ECC, consistent with certain disclosed embodiments of the present invention.

When a mobile set moves to a coverage area of a new transmitter, known as hand-off, the mobile set has to perform a re-authentication. To provide efficient processing, assume that an authentication server 140 with a service scheduler needs to do a scheduling for the arriving authentication request messages to head end system 110. FIG. 1B shows an exemplary operation of an authentication method based on ECC, consistent with certain disclosed embodiments of the present invention.

Refer to both FIG. 1A and FIG. 1B. As label 115 of FIG. 1B shows, at least a request message from mobile sets will arrive at head end system 110 for authentication simultaneously or in a short period of time. According to the authentication method of the present invention, each broadcast authentication message is manipulated with ECC and pairing operation, shown as label 135 of FIG. 1B. Each request message from the mobile sets is manipulated with ECC, shown as label 125 of FIG. 1B. From ECC and pairing operation, head end system 110 and the mobile set perform mutual authentication, shown as label 145 of FIG. 1B.

There may exist requests from a plurality of mobile sets arriving at the head end system simultaneously or in a short period of time, and among these requests some may request the same service to the head end system. For example, m users $ur_1, ur_2, ur_3, \ldots, ur_m$ requesting the same service arrive at the head end system for authentication. In the disclosed exemplary embodiment according to the present invention, the authentication process of these m users $ur_1, ur_2, ur_3, \ldots, ur_m$ requesting the same service is called one authentication process, with the same service depicted as V. In other words, for the requests of the same service, an authentication broadcast message is broadcasted to all the corresponding requesting mobile sets, shown as label 155 of FIG. 1B. The head end system has to efficiently execute the authentication process simultaneously or within a short period of time.

The following defines the symbols for describing the present invention.

- $Q_H$: the public key of the head end system;
- $Q_I$: the public key of the i-th user;
- $P_I$: the private key of the i-th user;
- $P_{AH}$: the authentication public key of the head end system;
- $P_{AI}$: the authentication public key of the i-th user;
- $P_{Ks}$: the share secret between the head end system and the mobile set;
- $k_s$: secret key generated by the i-th mobile set;
- $k_h$: secret key generated by the head end system;
- $H_1(\bullet)$: one way hash function mapping $\{0, 1\}^* \to G_1$;
- $H_2(\bullet)$: one way hash function mapping $\{0, 1\}^* \to G_2^\circ$ The authentication method based on ECC of the present invention may include four phases: the initialization phase, the issue phase, the subscription phase and the hand-off authentication. With the aforementioned symbol definitions, the following describes the execution of each phase.

In the initialization phase, the head end system is responsible for the public and private information of all the entities. The head end system has to generate a plurality of parameters to construct a secure communication system. It shows a schematic view of an exemplary operation of a head end system in the initialization phase, consistent with certain disclosed embodiments of the present invention.

Figure 2:
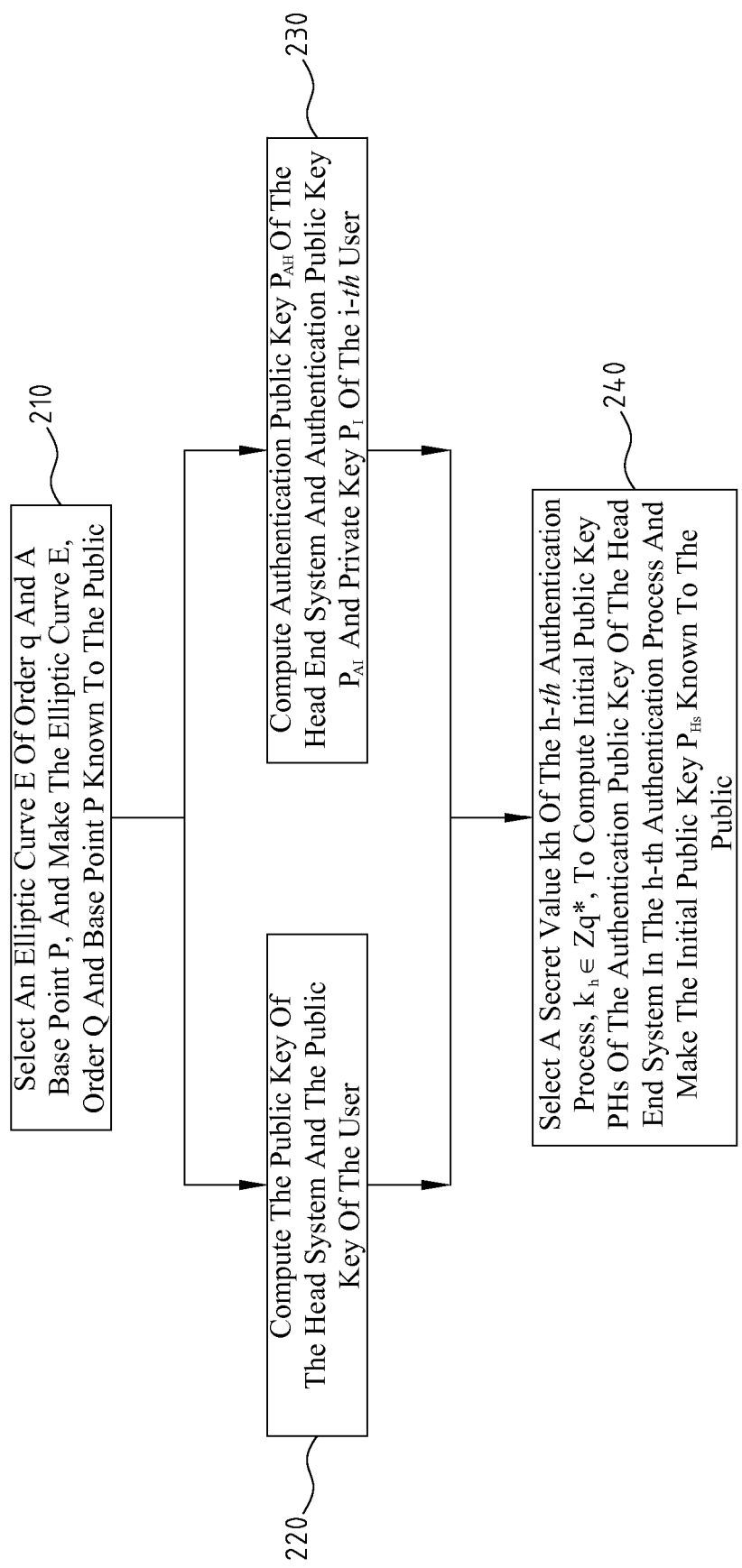
FIG. 2 shows a schematic view of an exemplary operation of a head end system in the initialization phase, consistent with certain disclosed embodiments of the present invention.

Referring to FIG. 2, when a request message form a user, e.g., i-th user, arrives at head end system 110 for authentication, as shown in step 210, the head end system selects an elliptic curve E of order q and a base point P, and makes the elliptic curve E, order q and base point P known to the public. In the step 220, the public key $Q_H$ of the head end system and the public key $Q_I$ of the user are computed. For example, public key $Q_H$ may be computed with identity $ID_H$ of the head end system, and public key $Q_I$ may be computed with identity $ID_I$ of i-th user, such as $Q_H = H_1(ID_H)$, $Q_I = (I_{DI})$. In step 230, authentication public key $P_{AH}$ of the head end system and authentication public key $P_{AI}$ and private key $P_I$ of the i-th user are computed, for example, by selecting an $x \in Z_q^*$ to compute $P_{AH} = x \cdot P$ and selecting an $s \in Z_q^*$ to compute $P_{AI} = s \cdot P$ and $P_I = s \cdot Q_I$, where x and s are both secret. Step 240 is to select a secret value $k_h$, $k_h \in Z_q^*$, to compute an initial public key $P_{Hs}$ of the authentication public key of the head end system and make the initial public key $P_{Hs}$ known to the public, for example, by using secret value $k_h$ and authentication public key $P_{AH}$ to compute $P_{Hs} = k_h \cdot P_{AH}$.

Figure 3:
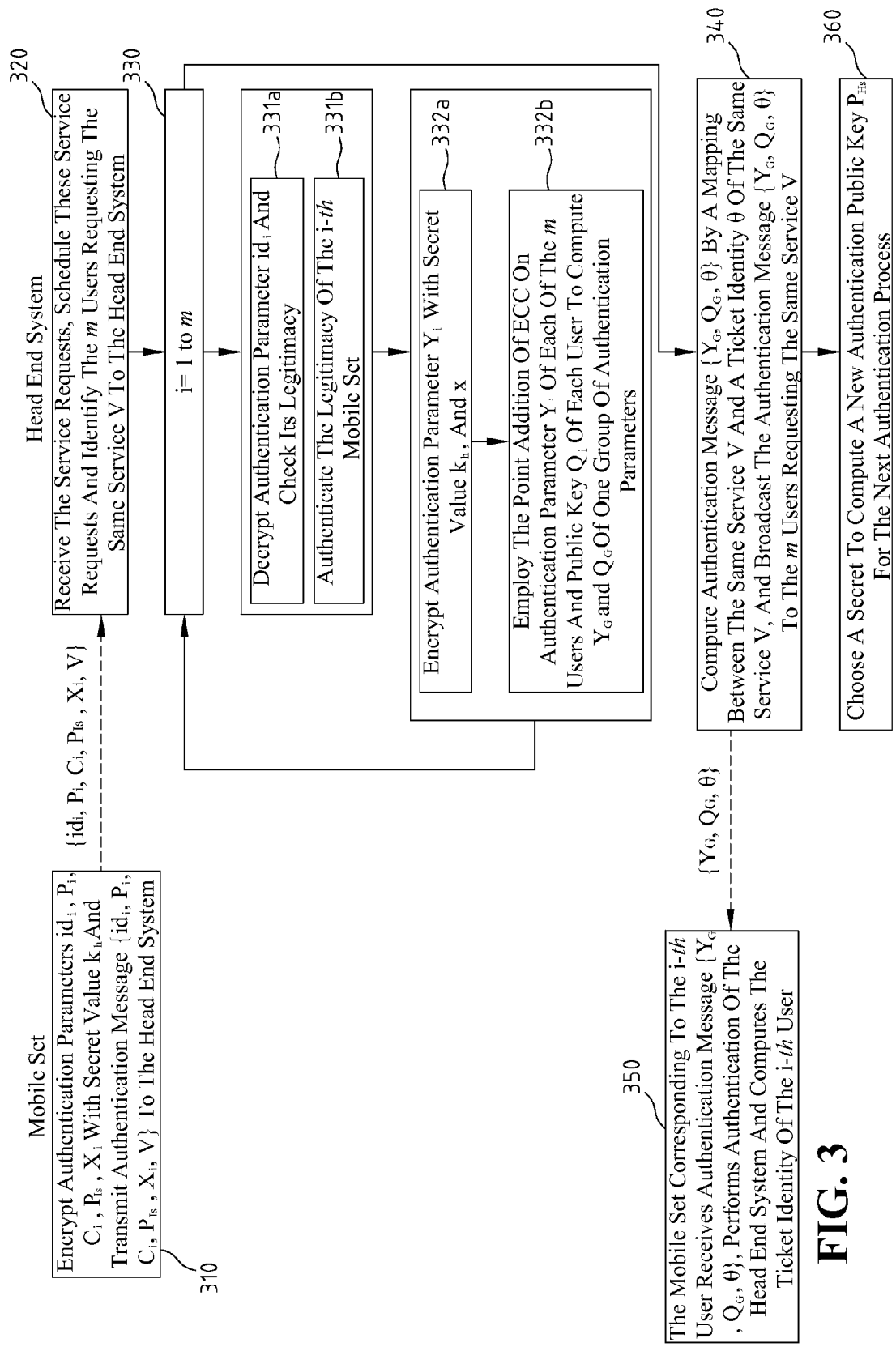
FIG. 3 shows a schematic view of an exemplary operation of the communication protocol between a head end system and a mobile set in the issue phase, consistent with certain disclosed embodiments of the present invention.

When a mobile user requests services, the authentication method enters the issue phase. In the execution of the issue phase, the mobile set issues a service set-up request to launch an execution of mutual authentication. FIG. 3 shows a schematic view of an exemplary operation of the communication protocol between a head end system and a mobile set in the issue phase, consistent with certain disclosed embodiments of the present invention.

Referring to the exemplary operation of FIG. 3, step 310 is for the mobile set to encrypt authentication parameters $id_i$, $P_i$, $C_i$, $P_{Is}$, $X_i$ with secret value $k_h$ and transmit authentication message $\{id_i, P_i, C_i, P_{Is}, X_i, V\}$ to the head end system. The encryption to the authentication parameters may employ ECC technique, such as, $P_{Is} = k_s \cdot P_{AI}$, $P_i = k_s \cdot P$, $C_i = k_s \cdot P_I + k_s \cdot Q_H$, $X_i = k_s \cdot P_{Hs} \cdot id_i = ID_I + k_s \cdot P_{AH}$. Step 320 is for the service scheduler of the head end system to receive the service requests, schedule these service requests and identify the m users requesting the same service V to the head end system.

In step 330, the head end system performs sub-steps 331a, 331b, 332a, and 332b for the request of each user i of the m users. Sub-step 331a is to decrypt authentication parameter $id_i$ and check its legitimacy, for example, by employing ECC to decrypt authentication parameter $id_i$. Sub-step 331b is to authenticate the legitimacy of the i-th mobile set, for example, by employing pairing operation to check whether the equation $\hat{e}(C_i, P_{Hs}) = \hat{e}(Q_I, P_{Ks}) \cdot \hat{e}(Q_H, X_i)$ holds. If the equation holds, the head end system will accept that the i-th mobile set is legitimate, i.e., genuine; otherwise, the head end system rejects the authentication. This is reasonable because $P_{Ks} = k_h \cdot x \cdot P_{Is} = k_h \cdot x \cdot k_s \cdot s \cdot P = k_s \cdot s \cdot k_h \cdot x \cdot P = k_s \cdot s \cdot P_{Hs}$, which is the share secret between the head end system and the i-th user.

Sub-step 332a is to encrypt authentication parameter $Y_i$ with secret value $k_h$, and x, for example, by employing ECC to compute $Y_i = k_h \cdot x \cdot Q_I$. In sub-step 332b, the head end system employs the point addition of ECC on authentication parameter $Y_i$ of each of the m users and public key $Q_I$ of each user to compute $Y_G$ and $Q_G$ of one group of authentication parameters, for example, by employing ECC to sum up authentication parameter $Y_i$ of each of the m users and public key $Q_I$ of each user, i.e., $$Y_G = \sum_{i=1}^{m}(Y_i) \text{ and } Q_G = \sum_{I=1}^{m}(Q_I);$$

and treat $Y_G$ and $Q_G$ as one group of authentication parameters. In other words, the head end system provides the pairing bilinear operation to the mobile set through the iterative point addition of ECC to improve the broadcast effect.

After all the m users finish the above sub-steps, step 340 is executed. In step 340, the head end system computes authentication message $\{Y_G, Q_G, \theta\}$ by a mapping between the same service V and a ticket identity $\theta$ of the same service V, and broadcasts the authentication message $\{Y_G, Q_G, \theta\}$ to the m users requesting the same service V. The head end system may employ the pairing from ECC to compute the ticket identity $\theta$, for example, by first computing the service ticket $\alpha$ of the requested service V of the m users, $\alpha=H_2(V, Y_G)$, then performing pairing with $Q_G$ to compute $\theta$, $\theta=\hat{e}(P_{Hs}, Q_G)\oplus\alpha$, where $H_2$ is a one-way hash function.

In step 350, the mobile set corresponding to the i-th user receives authentication message $\{Y_G, Q_G, \theta\}$, performs authentication of the head end system and computes the ticket identity of the i-th user. The mobile set may authenticate the head end system through verifying whether the equation $\hat{e}(Y_G, k_s\cdot s\cdot P)=\hat{e}(Q_G, P_{Ks})$ holds or not. If the equation holds, the mobile set of the i-th user accepts that the head end system is legitimate, i.e., genuine; otherwise, rejects the authentication and terminates the service process. This is correct, proven as follows:

$$\hat{e}(Y_G, k_s \cdot s \cdot P) = \hat{e}\left(\sum_{i=1}^{m}(Y_i), k_s\cdot s\cdot P\right)$$
$$= \hat{e}\left(\sum_{I=1}^{m}(k_h\cdot x\cdot Q_I), k_s\cdot s\cdot P\right)$$
$$= \hat{e}\left(\sum_{I=1}^{m}(Q_I), k_s\cdot s\cdot P\right)k_h\cdot x$$
$$= \hat{e}\left(\sum_{I=1}^{m}(Q_I), k_s\cdot s\cdot k_h\cdot x\cdot P\right)$$
$$= \hat{e}\left(\sum_{I=1}^{m}(Q_I), P_{Ks}\right)$$
$$= \hat{e}(Q_G, P_{Ks})$$

where $P_{Ks}=k_s\cdot s\cdot P_{Hs}=k_s\cdot s\cdot k_h\cdot x\cdot P=k_h\cdot x\cdot k_s\cdot s\cdot P=k_h\cdot x\cdot P_{Is}$.

Besides, the mobile set may compute the i-th service $\theta_i$ by the equation $\theta_i=\theta\cdot\hat{e}(P_{Hs}, (Q_G+(-Q_I)))^{-1}$, and store the service $\theta_i$. This is correct, proven as follows:

$$\hat{e}(P_{Hs}, Q_G) = \hat{e}(P_{Hs}, (Q_1 + Q_2 + \ldots + Q_I + \ldots + Q_m))$$
$$= \hat{e}(P_{Hs}, Q_I)\cdot\hat{e}(P_{Hs}, (Q_1 + Q_2 + \ldots + Q_I + \ldots + Q_m - Q_I))$$
$$= \hat{e}(P_{Hs}, Q_I)\cdot\hat{e}(P_{Hs}, (Q_G - Q_I))$$

Then, $\hat{e}(P_{Hs}, Q_G)\oplus\alpha=(\hat{e}(P_{Hs}, Q_I)\oplus\alpha)\cdot\hat{e}(P_{Hs}, (Q_G-Q_I))$ and $\theta=\theta_i\cdot\hat{e}(P_{Hs}, (Q_G-Q_I))$;
therefore, $\theta_i=\theta\cdot\hat{e}(P_{Hs}, (Q_G+(-Q_I)))^{-1}$ After the head end system finishes step 340, the head end system may choose a secret to compute a new authentication public key $P_{Hs}$ for the next authentication process, as shown in step 360. For example, by choosing a new secret value $k_h$ to compute new the authentication public key $P_{Hs}=k_h\cdot P_{AH}$.

Following the above disclosed, the present invention may also prove the following items.

(1) In efficient authentication from ECC protocol (E-AEP for short), if a mobile set is a legitimate set, then the head end system is able to authenticate the mobile set. Proven as follows:
   According to the aforementioned ECDLP, without knowing secret value $k_s$, the adversary cannot forge the valid $P_{Is}$ and $X_i$, and therefore cannot compute $C_i=k_s\cdot P_I+k_s$. Also, according to the aforementioned steps of head end system authentication, after the head end system receives message $\{id_i, P_i, C_i, P_{Is}, X_i, V\}$, the head end system will verify whether the equation $\hat{e}(C_i, P_{Hs})=\hat{e}(Q_I, P_{Ks})\cdot\hat{e}(Q_H, X_i)$ holds or not, and the correctness of the equation is also proven by the present invention. Therefore, the head end system is able to authenticate the mobile set.

(2) In E-AEP, if a head end system is a legitimate head end system, then the mobile set is able to authenticate the head end system. Proven as follows:
   According to the aforementioned step 350, without knowing the secret value $k_h$ and x, the adversary cannot forge the valid $Y_i$, and therefore cannot forge valid $Y_G$. Without knowing the secret value $k_s$, the adversary cannot forge $P_{Is}$. Because $Q_I$ is obtained through $ID_I$ and hash function $H_1(\bullet)$, the adversary cannot forge valid $Q_I$ and $Q_G$. If the adversary tries to forge the valid $\theta$ as $\theta=\hat{e}(P_{Hs}, Q_G)\oplus\alpha$, the adversary will face the discrete logarithm problem in the bilinear pairing and cannot obtain the valid $\theta$. The i-th mobile set, after receiving message $\{Y_G, Q_G, \theta\}$, will check whether the equation $\hat{e}(Y_G, k_s\cdot s\cdot P)=\hat{e}(Q_G, P_{Ks})$ holds, and the correctness of the equation is also proven by the present invention. Therefore, the mobile set is able to authenticate the head end system.

(3) E-AEP can provide anonymous service. Proven as follows:
   Because identity $ID_I$ of the i-th user is translated as $Q_I$ by hash function $H_1(\bullet)$, $P_I=s\cdot Q_I$ is obtained through encryption with secret value s by an elliptic curve public key system, and $C_i=k_s\cdot P_I+k_s$ is obtained through encryption with secret value $k_s$ by an elliptic curve public key system, there is no information about identity $ID_I$ in the message $\{id_i, P_i, C_i, P_{Is}, X_i, V\}$. On the other hand, identity $ID_I$ is translated as $Q_I$ by hash function $H_1(\bullet)$, and $Y_i=k_h\cdot x\cdot Q_I$ is obtained through encryption with secret value $k_h$ and x by an elliptic curve public key system; therefore, $$Y_G = \sum_{i=1}^{m}(Y_i)$$

is an encrypted value. $Q_G$ is computed by $$Q_G = \sum_{I=1}^{m}(Q_I),$$

and $\theta$ is computed through pairing operation $\theta=\hat{e}(P_{Hs}, Q_G)\oplus\alpha$; therefore, no information regarding identity $ID_I$ is exposed in message $\{Y_G, Q_G, \theta\}$. So, it is difficult for the adversary to solve identity $ID_I$ with the hash function security.

Figure 4:
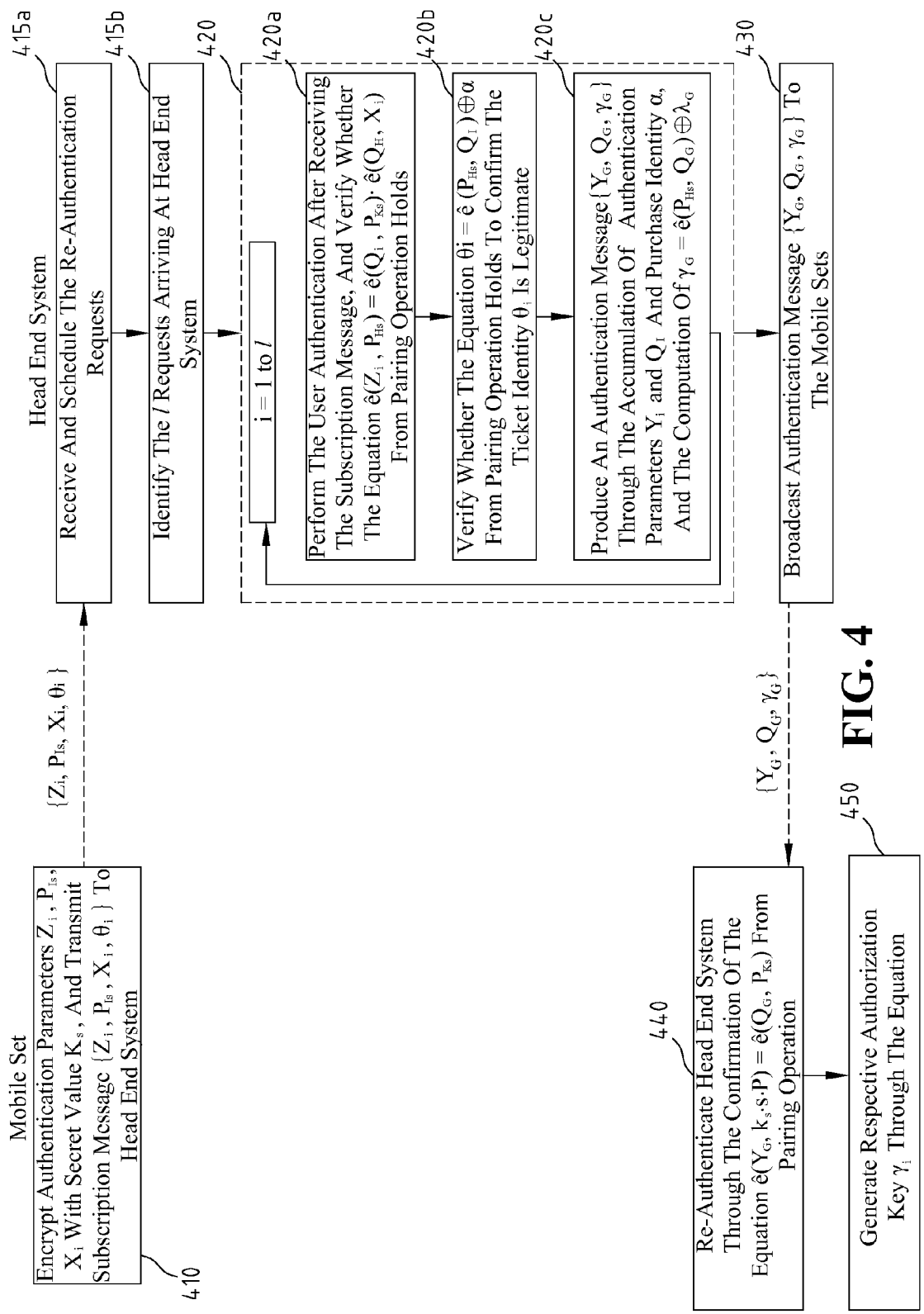
FIG. 4 shows a schematic view of an exemplary operation of the communication protocol between a head end system and a mobile set in the subscription phase, consistent with certain disclosed embodiments of the present invention.

When the valid message is received, the handheld user may use the ticket identity to subscribe some services. When the user tries to subscribe a certain service V, the user has to perform the communication protocol of the subscription phase. FIG. 4 shows a schematic view of an exemplary operation of the communication protocol between a head end system and a mobile set in the subscription phase, consistent with certain disclosed embodiments of the present invention.

Referring to FIG. 4, the mobile set encrypts authentication parameters $Z_i$, $P_{Is}$, $X_i$ with secret value Ks, and transmits subscription message $\{Z_i, P_{Is}, X_i, \theta_i\}$ to head end system 110, as shown in step 410. In step 415a, head end system 110 receives and schedules the re-authentication requests. In step 415b, head end system 110 identifies the l requests arriving at head end system 110. Then, head end system 110 performs a loop procedure 420 of subscription communication protocol. That is, for each subscriber of the l requests, head end system 110 performs sub-steps 420a, 420b and 420c. Sub-step 420a is to perform the user authentication after receiving the subscription message, and verify whether the equation $\hat{e}(Z_i, P_{Hs})=\hat{e}(Q_I, P_{Ks})\cdot\hat{e}(Q_H, X_i)$ from pairing operation holds. Sub-step 420b is to verify whether the equation $\theta_i=\hat{e}(P_{Hs}, Q_I)\oplus\alpha$ from pairing operation holds to confirm the ticket identity $\theta_i$ is legitimate.

In sub-step 420a, if the equation from pairing operation is confirmed, the user issuing the subscription message is genuine. In sub-step 420b, if the equation from pairing operation is confirmed, the user obtains a service right.

In loop procedure 420, head end system 110 may employ the following operations on elliptic curve E to manipulate authentication parameters $Y_i$ and $Q_I$ into $Y_G$ and $Q_G$, and manipulate purchase identity $\alpha$ into $\lambda_G$.

$$Y_i = k_h \cdot x \cdot Q_I$$

$$Y_G = Y_G + Y_i$$

$$Q_G = Q_G + Q_I$$

$$\lambda_G = \lambda_G + \alpha$$

In other words, head end system 110 employs the iterative point additions of authentication parameters $Y_i$ and $Q_I$ and purchase identity $\alpha$, and the computation of $\gamma_G = \hat{e}(P_{Hs}, Q_G) \oplus \lambda_G$ to produce an authentication message $\{Y_G, Q_G, \gamma_G\}$, as shown in sub-step 420c. In step 430, the authentication message $\{Y_G, Q_G, \gamma_G\}$ is broadcasted to the mobile sets.

The mobile set may re-authenticate head end system 110 through the confirmation of the equation $\hat{e}(Y_G, k_s \cdot s \cdot P)=\hat{e}(Q_G, P_{Ks})$ from pairing operation, as shown in step 440. If the equation is confirmed, the re-authenticated head end system 110 is genuine.

If the equation $\hat{e}(Y_G, k_s \cdot s \cdot P)=\hat{e}(Q_G, P_{Ks})$ is confirmed, the mobile set may generate respective authorization key $\gamma_i$ through the equation $\gamma_i = \gamma_G \cdot \hat{e}(P_{Hs}, (Q_G+(-Q_I)))^{-1}$, as shown in step 450. In other words, the mobile set may derive respective authorization key $\gamma_i$ through the iterative additions and the pairing operations of the authentication parameters. Then, the mobile set may obtain the service by the respective authorization key $\gamma_i$ and its private key.

Figure 5:
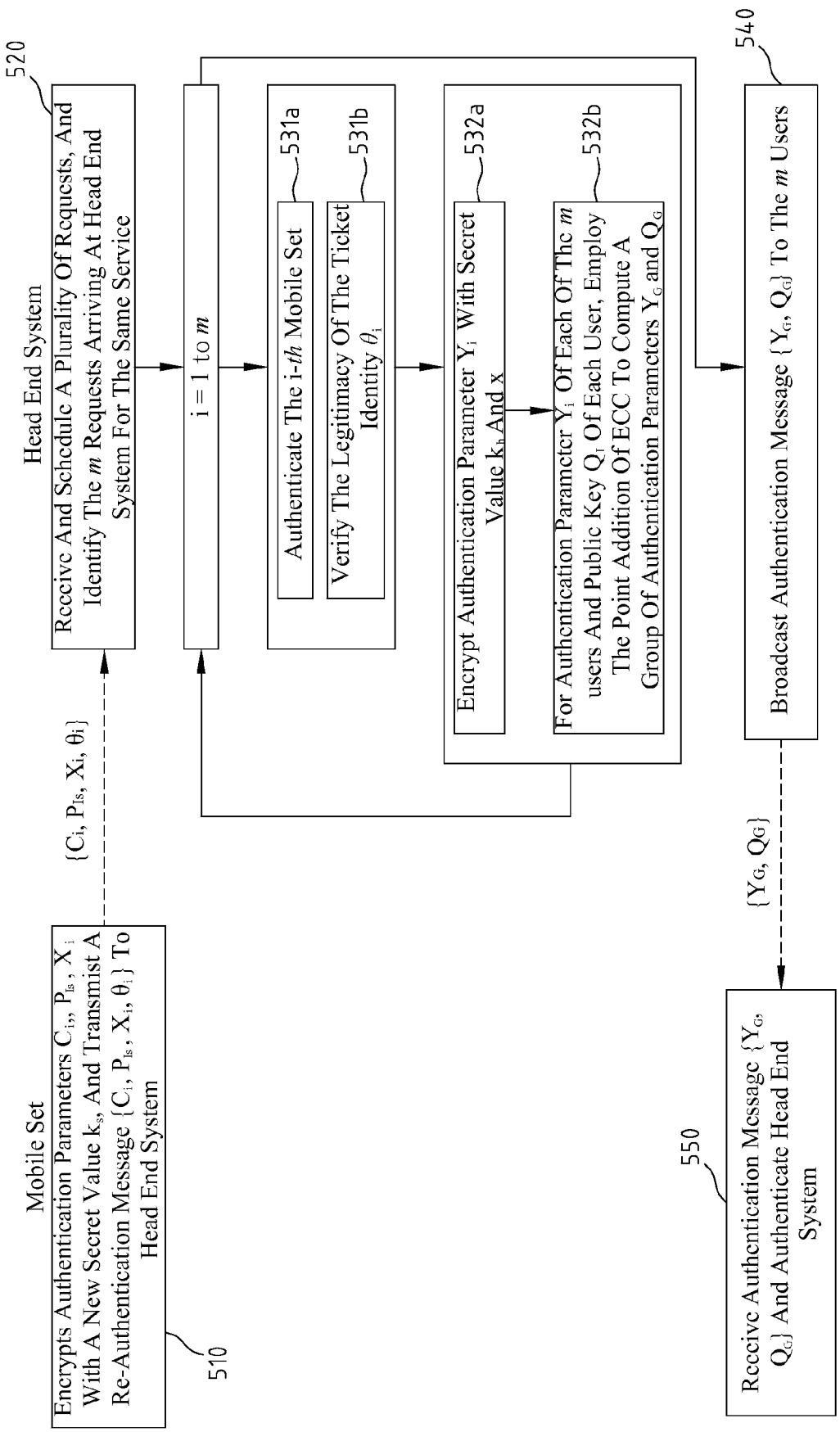
FIG. 5 shows a schematic view of an exemplary operation of the re-authentication protocol between a head end system and a mobile set when a hand-off occurs, consistent with certain disclosed embodiments of the present invention.

When the mobile set moves to a coverage area of a different transmitter, a hand-off occurs and the mobile set has to perform the re-authentication communication protocol. In a hand-off, a forged transmitter or TV station may forge as a genuine transmitter or TV station. FIG. 5 shows a schematic view of an exemplary operation of the re-authentication protocol between a head end system and a mobile set when a hand-off occurs, consistent with certain disclosed embodiments of the present invention.

Referring to FIG. 5, as shown in step 510, the mobile set encrypts authentication parameters $C_i$, $P_{Is}$, $X_i$ with a new secret value $k_s$, such as by employing ECC, and transmits a re-authentication message $\{C_i, P_{Is}, X_i, \theta_i\}$ to head end system 110. In step 520, head end system 110 receives and schedules a plurality of requests, such as, by service scheduler to schedule, and identifies the m requests arriving at head end system 110 for the same service. Then, for each request, the following sub-steps are executed.

In sub-step 531a, head end system 110 authenticates the i-th mobile set, such as by restoring $Q_I$, $P_{Hs}$, $\alpha$ of i-th mobile set and verifies whether the equation $\hat{e}(C_i, P_{Hs})=\hat{e}(Q_I, P_{Ks})\cdot\hat{e}(Q_H, X_i)$ from pairing operation holds. In sub-step 531b, head end system 110 verifies the legitimacy of the ticket ID $\theta_i$, such as by checking whether the equation $\theta_i=\hat{e}(P_{Hs}, Q_I)\oplus\alpha$ from pairing operation holds.

In sub-step 532a, the ECC may be applied to encrypt authentication parameter $Y_i$ with secret value $k_h$ and x, such as $Y_i=k_h\cdot x\cdot Q_I$. In sub-step 532b, for authentication parameter $Y_i$ of each of the m users and public key $Q_I$ of each user, the head end system employs the point addition of ECC to compute a group of authentication parameters $Y_G$ and $Q_G$, such as by employing ECC to sum up authentication parameter $Y_i$ of each of the m users and to sum up public key $Q_I$ of each user.

In step 540, head end system 110 broadcasts authentication message $\{Y_G, Q_G\}$ to the m users. In step 550, the mobile set receives authentication message $\{Y_G, Q_G\}$ and authenticates head end system 110, such as, by checking whether the equation $\hat{e}(Y_G, k_s\cdot s\cdot P)=\hat{e}(Q_G, P_{Ks})$ from pairing operation holds.

The above disclosed embodiments of the present invention may provide a secure authentication protocol to resist attacks, such as attacks from man-in-the-middle, attacks from forgers or attacks of replay in E-AEP. The following proves how the present invention resists the attacks.

(1) Resists attacks from forgers: Without knowing secret value $k_s$, an attacker cannot forge a valid message $\{id_i, P_i, C_i, P_{Is}, X_i, V\}$. If the attacker tries to crack secret value $k_s$ to forge $P_{Is}$ and $X_i$, the attacker will face the discrete logarithm problem in bilinear pairing operation, i.e., $P_{Is}=k_s\cdot P_{AI}$ and $X_i=k_s\cdot P_{Hs}$. If the attacker tries to crack secret value $k_s$ to forge a $C_i$, the attacker will also face a discrete logarithm problem in bilinear pairing operation, i.e., $C_i=k_s\cdot P_I+k_s\cdot Q_H$. On the way from the head end system to the mobile set, without knowing secret values $k_h$ and $k_s$, the attacker cannot forge a valid message $\{Y_G, Q_G, \theta\}$. If the attacker tries to crack secret value $k_h$ to forge $Y_G$, the attacker will face a discrete logarithm problem in bilinear pairing operation, i.e., $$Y_G = \sum_{i=1}^{m}(Y_i) = \sum_{I=1}^{m}(k_h\cdot x\cdot Q_I).$$

If an attacker tries to crack secret value $k_s$ to forge $P_{Is}$, the attacker will face a discrete logarithm problem in bilinear pairing operation, i.e., $P_{Is}=k_s\cdot P_{AI}$. Because of the hash function security, it is difficult for the attacker to forge $Q_G$ as $$Q_G = \sum_{I=1}^{m}(Q_I) = \sum_{I=1}^{m}(H_1(ID_I)).$$

If an attacker tries to forge $\theta$ as $\theta=\hat{e}(P_{Hs}, Q_G)\oplus\alpha$, the attacker has to know the valid value of $\hat{e}(P_{Hs}, Q_G)$ and $\alpha$. Also, without knowing s, x, $k_s$ and $k_h$, the attacker cannot forge $\theta$. Because of the hash function security, it is difficult for the attacker to forge $\alpha$ as $\alpha=H_2(V, Y_G)$.

(2) Resists attacks from man-in-the-middle: Because the head end system and the mobile set shares secret value $P_{Ks}$. The head end system computes $P_{Ks}=k_h\cdot x\cdot P_{Is}=k_h\cdot x\cdot k_s\cdot P_{AI}=k_h\cdot x\cdot k_s\cdot s\cdot P$ through the equation $P_{Ks}=k_h\cdot x\cdot P_{Is}$. Without knowing $k_s$ and $k_h$, the attacker cannot forge valid $P_{Ks}$. If the attacker forges $\{id_i, P_i, C_i, P_{Is}, X_i, V\}$ without knowing secret value $k_s$, the head end system will identify that $\hat{e}(C_i, P_{Hs})\neq\hat{e}(Q_I, P_{Ks})\cdot\hat{e}(Q_H, X_i)$. That is, the equation does not hold. This is because the attacker does not have the share secret value $P_{Ks}$. The head end system will reject authentication and terminate the service process. On the other hand, the mobile set compute $P_{Ks}=k_s \cdot s \cdot P_{Hs}=k_s \cdot x \cdot k_h \cdot P_{AH}=k_s \cdot s \cdot k_h \cdot x \cdot P$ through the equation $P_{Ks}=k_s \cdot s \cdot P_{Hs}$. If the attacker does not know secret value $k_h$ and x, and forges $\{Y_G, Q_G, \theta\}$, the mobile set will identify that the equation $\hat{e}(Y_G, k_s \cdot s \cdot P) = \hat{e}(Q_G, P_{Ks})$ does not holds. The mobile set will reject authentication and terminate the service process.

(3) Resists attacks of replay: To resist the attacks of replay, an exemplary easy way is to embed timestamps into the authentication message. However, time synchronization is required for the timestamp scheme. In the present invention, because secret value $k_h$ of each authentication process is randomly chosen by the head end system, $\{id_i, P_i, C_i, P_{Is}, X_i, V\}$ message is random and may be randomly changed. Similarly, secret value $k_s$ of each authentication process is randomly chosen, and $\{Y_G, Q_G, \theta\}$ message is random and may be randomly changed. Therefore, the present invention may greatly reduce the possibility of attacks of replay.

FIG. 6A and FIG. 6B respectively show an exemplary comparison of the communication cost and computational cost between the disclosed embodiments of the present invention and a conventional technique, i.e., Song's method. In the FIG. 6A, assumes that ID and timestamp length are both 32 bits, the length of the largest prime number in modular operation is 1024 bits, and the length of a point in ECC is 320 bits.

As shown in the exemplary comparison and analysis of FIG. 6A, the present invention performs better in terms of communication cost. A better broadcast effect is achieved for the authentication broadcast message. Because the disclosed embodiments of the present invention take into the account the scenario that a plurality of requests to the same service may occur simultaneously or in a short period of time. As shown in FIG. 6A, the head end system of the present invention only requires to broadcast a 0.96K-bit authentication broadcast message $\{Y_G, Q_G, \theta\}$ for m requests arriving simultaneously or in a short period of time, while the Song's method requires m*2.779K-bit authentication delivery message. Therefore, the disclosed embodiments of the present invention are more efficient in broadcasting messages to the subscribers.

In the exemplary comparison and analysis in FIG. 6B, e is the pairing operation, $M_{G1}$ is the multiplication in $G_1$, $A_{G1}$ is the addition in $G_1$, $E_{\%}$ is the modular index and $M_{\%}$ is the modular multiplication. FIG. 6B shows the computational cost of the head end system and the mobile set in the scenario that m requests arriving simultaneously or in a short period of time. In Song's method, no above scenario is taken into account. However, the disclosed embodiments of the present invention take the one-to-many scenario into account. As shown in the exemplary comparison and analysis of FIG. 6B, the present invention performs better in terms of computational cost and broadcast effect for authentication message.

In the issuing phase, it may be seen from FIG. 6B, the disclosed embodiments of the present invention only require a 1.92K-bit authentication message, while Song's method requires 3.8K-bit to issue a certification message. In broadcasting, when m requests arrive simultaneously or in a short period of time, the present invention only requires a 0.96K-bit authentication broadcast message, while Song's method requires m*2.78K-bit. In the subscription phase, the disclosed embodiments of the present invention only require a 1.28K-bit subscription message, while Song's method requires 4.82K-bit to complete a subscription message. In broadcasting, the disclosed embodiments of the present invention only require 0.96K-bit message, while Song's method requires m*3.77K-bit message.

When m requests to the same service arrive simultaneously or in a short period of time, the disclosed embodiments according to the present invention only requires for broadcasting a message by the head end system in an authentication process. While in Song's method, m messages are required. Therefore, the present invention may provide an efficient method for message broadcast to the mobile sets.

In summary, the disclosed exemplary embodiments of the present invention may provide an authentication method from ECC. In the case that m requests arrive the head end system simultaneously or in a short period of time, the authentication method only employs an authentication broadcast message by the pairing operation to achieve effective broadcasting of authentication messages and performs better in terms of both communication cost and computational cost. The authentication method employs ECC and has inherited the high security and small key size of the ECC so as to achieve the mutual authentication between the head end system and the mobile set, as well as provide anonymous service. The authentication method may resist the attacks from man-in-the-middle and forgers, and reduce the attach probability from the replay.

Although the present invention has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An authentication method employing elliptic curve cryptography (ECC), applicable to a mobile broadcast TV system, said mobile broadcast TV system at least having one or more head end systems, at least one or more transmitters and one or more mobile sets, said authentication method comprising the steps of:

one or more request messages from said one or more mobile sets arriving at a head end system of said one or more head end systems for authentication simultaneously or in a short period of time;

manipulating each request message from said one or more mobile sets by employing ECC;

manipulating each broadcast authentication message by employing ECC and pairing operations;

said head end system and said one or more mobile sets performing mutual authentication by employing the pairing operation and ECC; and broadcasting an authentication message for a plurality of request messages for a same service arriving simultaneously or in a short period of time to said one or more mobile sets;

wherein said authentication method further includes execution of initialization phase, execution of issue phase, execution of subscription phase and execution of handoff authentication; and in said execution of issue phase, communication protocol between said one or more mobile sets and said head end system further includes:

said one or more mobile sets encrypting a plurality of authentication parameters with a secret value $k_h$, and transmitting an authentication message to said head end system for a V service, wherein the mobile set corresponding to an i-th user encrypts said authentication parameters including $id_i, P_i, C_i, P_{Is}, X_i$ with said secret value $k_h$, and transmitting said authentication message including $\{id_i, P_i, C_i, P_{Is}, X_i, V\}$ to said head end system;

said head end system receiving a plurality of user requests and scheduling said plurality of user requests, and identifying m user requests that request for said V service, m being a positive integer;

for each request from said i-th user of said m user requests, said head end system checking legitimacy of authentication parameter $id_i$ to authenticate legitimacy of said i-th user;

said head end system broadcasting an authentication broadcast message to those mobile sets corresponding to said m user requests;

the mobile set corresponding to said i-th user, after receiving said authentication broadcast message, authenticating said head end system and computing a ticket identity $\theta_i$ of said i-th user; and said head end system computing a new authentication public key for a next authentication process.

2. The method as claimed in claim 1, wherein when a request message from a user arrives at said head end system for authentication, said execution of initialization phase further includes:

selecting an elliptic curve with an order, and a base point, and making said elliptic curve, said order and said base point known to public;

computing a public key of said head end system and a public key of said user, respectively;

computing an authentication public key of said head end system and an authentication public key and a private key of said user, respectively; and selecting a secret value of another authentication process to compute an initial public key of said authentication public key of said head end system of said another authentication process, and making said initial public key known to the public.

3. The method as claimed in claim 1, wherein said broadcasting an authentication broadcast message to those mobile sets corresponding to said m user requests further includes:

for each request from said i-th user of said m user requests, encrypting authentication parameter $Y_i$ of said i-th user by using secret values $k_h$ and x;

for authentication parameter $Y_i$ and public key $Q_I$ of said i-th user, producing a group of authentication parameters $Y_G$ and $Q_G$; and computing a ticket identity $\theta$ mapped to said V service, and broadcasting an authentication message $\{Y_G, Q_G, \theta\}$ to the mobile sets corresponding to said m user requests.

4. The method as claimed in claim 3, wherein a service identity a of a service subscribed by said m user requests is computed, and the pairing operation is performed on said service identity $\alpha$ and $Q_G$ to obtain said ticket identity $\theta$.

5. The method as claimed in claim 4, wherein said service identity $\alpha$ is obtained through a hash function $H_2(V, Y_G)$.

6. The method as claimed in claim 3, wherein said group authentication parameters $Y_G$ and $Q_G$ are computed with point addition of ECC.

7. The method as claimed in claim 1, wherein in said execution of subscription phase, the communication protocol between said one or more mobile sets and said head end system further includes:

the mobile set corresponding to said i-th user encrypting three parameters $Z_i$, $P_{Is}$, $X_i$ by using a new secret value $K_s$, and transmitting a subscription message $\{Z_i, P_{Is}, X_i, \theta_i\}$ to said head end system;

said head end system receiving and scheduling a re-authentication request, and identifying a plurality of requests arriving at said head end system;

for said plurality of requests, said head end system executing a loop procedure of subscription communication protocol, said loop procedure at least including authenticating each i-th user that sends a subscription message for said plurality of requests and identifying legitimacy of identity $\theta_i$ of said i-th user, and generating an authentication message $\{Y_G, Q_G, \gamma_G\}$ through a plurality of iterative additions of authentication parameters $Y_i$ and $Q_I$ and subscription identity $\alpha$;

broadcasting said authentication message $\{Y_G, Q_G, \gamma_G\}$ to said one or more mobile sets;

said one or more mobile sets performing re-authentication of said head end system by checking whether an equation from the pairing operation holds; and each of said one or more mobile sets generating its own authentication key, respectively.

8. The method as claimed in claim 7, wherein said checking whether the equation from the pairing operation holds is to perform the authentication of said i-th user.

9. The method as claimed in claim 7, wherein said checking whether the equation from the pairing operation holds is to check whether said identity $\theta_i$ is legitimate.

10. The method as claimed in claim 8, wherein if said equation from the pairing operation holds, said i-th user is legitimate.

11. The method as claimed in claim 10, wherein if said equation from the pairing operation holds, said i-th user obtains service right of said V service.

12. The method as claimed in claim 1, said authentication method executes a hand-off authentication when the mobile set corresponding to said i-th user moves to a coverage area of a different transmitter.

13. The method as claimed in claim 12, wherein in the execution of said hand-off authentication of said V service, the communication protocol between said one or more mobile sets and said head end system further includes:

the mobile set corresponding to said i-th user encrypting three authentication parameters $C_i$, $P_{Is}$, $X_i$, by using a new secret value $k_s$, and transmitting a re-authentication message $\{C_i, P_{Is}, X_i, \theta_i\}$ to said head end system;

said head end system receiving and scheduling a plurality of requests, and identifying n requests arriving at said head end system for said V service, n being a positive integer;

for each request from a j-th user of said n requests, said head end system executing authentication of said j-th user and identifying the legitimacy of a ticket identity $\theta_j$ of said j-th user;

said head end system broadcasting an authentication broadcast message to those mobile sets corresponding to said n requests; and the mobile set corresponding to said i-th user receiving said authentication broadcast message and authenticating said head end system.

14. The method as claimed in claim 13, wherein said broadcasting an authentication broadcast message to those mobile sets corresponding to said n requests further includes:

encrypting authentication parameter $Y_i$ of the i-th user by using secret values $k_h$ and x;

for authentication parameter $Y_i$ and public key $Q_I$ of the i-th user of said n requests, computing a group of authentication parameters $Y_G$ and $Q_G$; and broadcasting an authentication message $\{Y_G, Q_G\}$ to those mobile sets corresponding to said n user requests.

15. The method as claimed in claim 14, wherein said group of authentication parameters $Y_G$ and $Q_G$ are computed with point addition of ECC.

16. The method as claimed in claim 13, wherein before authenticating said i-th user, public key $Q_I$ of said i-th user and service identity $\alpha$ and authentication public key $P_{Hs}$ of said head end system are restored.

17. The method as claimed in claim 13, wherein said authentication method authenticates said i-th user and identifies the legitimacy of the ticket identity $\theta_i$ of said i-th user by employing the pairing operation.

18. The method as claimed in claim 1, wherein said authentication method provides an anonymous service on user identity.

* * * * *

UNITED STATES PATENT AND TRADEMARK OFFICE
CERTIFICATE OF CORRECTION

PATENT NO.       : 8,117,447 B2
APPLICATION NO.  : 12/173024
DATED            : February 14, 2012
INVENTOR(S)      : Muh-Chyi Leu et al.

It is certified that error appears in the above-identified patent and that said Letters Patent is hereby corrected as shown below:

On the Title Page, add Item (60) as follows:

--Related U.S. Application Data
Provisional application No. 61/020,387, filed on Jan. 10, 2008--

Signed and Sealed this
Eleventh Day of September, 2012

David J. Kappos
*Director of the United States Patent and Trademark Office*